United States Patent
Jung et al.

(10) Patent No.: US 12,203,202 B2
(45) Date of Patent: Jan. 21, 2025

(54) LAUNDRY TREATING APPARATUS

(71) Applicant: LG Electronics Inc., Seoul (KR)

(72) Inventors: Youngho Jung, Seoul (KR); Sanghee Yoo, Seoul (KR); Sangho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/435,726

(22) Filed: Feb. 7, 2024

(65) Prior Publication Data

US 2024/0175190 A1     May 30, 2024

Related U.S. Application Data

(63) Continuation of application No. 18/079,509, filed on Dec. 12, 2022, now Pat. No. 11,926,949, which is a
(Continued)

(30) Foreign Application Priority Data

Mar. 4, 2020   (KR) ................. 10-2020-0027211

(51) Int. Cl.
| | |
|---|---|
| *D06F 34/34* | (2020.01) |
| *D06F 23/02* | (2006.01) |

(Continued)

(52) U.S. Cl.
CPC ............. *D06F 34/34* (2020.02); *D06F 23/02* (2013.01); *D06F 29/005* (2013.01); *D06F 39/12* (2013.01); *D06F 58/02* (2013.01); *F16B 2/00* (2013.01)

(58) Field of Classification Search
CPC .................................................... D06F 34/34
See application file for complete search history.

(56) References Cited

U.S. PATENT DOCUMENTS

| | | |
|---|---|---|
| 2009/0126419 A1 | 5/2009 | Yoon et al. |
| 2015/0043135 A1 | 2/2015 | Bas |

FOREIGN PATENT DOCUMENTS

| | | |
|---|---|---|
| CN | 1730786 | 2/2006 |
| CN | 101333752 | 12/2008 |

(Continued)

OTHER PUBLICATIONS

Extended European Search Report in European Appln. No. 21158958.5, dated Jul. 27, 2021, 11 pages.
(Continued)

*Primary Examiner* — Jason Y Ko
(74) *Attorney, Agent, or Firm* — Fish & Richardson P.C.

(57) ABSTRACT

Disclosed is a laundry treating apparatus. The laundry treating apparatus includes a first treating apparatus having a first front panel disposed on a front face thereof and a first drum disposed therein for accommodating laundry, and a second treating apparatus disposed beneath the first treating apparatus to support the first treating apparatus. The second treating apparatus has a second front panel disposed on a front face thereof and a second drum disposed therein for accommodating the laundry. The laundry treating apparatus further includes a control panel disposed between the first front panel and the second front panel. The control panel is signally connected to the first treating apparatus and the second treating apparatus. The control panel is inserted between the first front panel and the second front panel, and is fixed by sliding in a lateral direction.

20 Claims, 11 Drawing Sheets

Related U.S. Application Data continuation of application No. 17/192,489, filed on Mar. 4, 2021, now Pat. No. 11,560,662.

(51) Int. Cl.
    *D06F 29/00*     (2006.01)
    *D06F 39/12*     (2006.01)
    *D06F 58/02*     (2006.01)
    *F16B 2/00*     (2006.01)

(56) References Cited

FOREIGN PATENT DOCUMENTS

| | | |
|---|---|---|
| CN | 108239844 | 7/2018 |
| CN | 105937122 | 11/2018 |
| CN | 208309216 | 1/2019 |
| EP | 3521501 | 8/2019 |
| GB | 191511213 | 8/1916 |
| KR | 20060089083 | 8/2006 |
| KR | 100652459 | 12/2006 |
| KR | 20070003527 | 1/2007 |
| KR | 20070070954 | 7/2007 |
| KR | 20080021921 | 3/2008 |
| KR | 10-2018-0136173 | 12/2018 |
| WO | WO2015172571 | 11/2015 |

OTHER PUBLICATIONS

Notice of Allowance in Chinese Appln. No. 202110230894.3, mailed on Aug. 30, 2023, 16 pages (with English translation).
Office Action in Chinese Appln. No. 202110230894.3, dated Nov. 28, 2022, 13 pages (with English translation).

LAUNDRY TREATING APPARATUS

CROSS-REFERENCE TO RELATED APPLICATION

This application is a continuation of U.S. application Ser. No. 18/079,509, filed on Dec. 12, 2022, which is a continuation of U.S. application Ser. No. 17/192,489, filed on Mar. 4, 2021, now U.S. Pat. No. 11,560,662, which claims the benefit of Korean Patent Application No. 10-2020-0027211, filed on Mar. 4, 2020. The disclosures of the prior applications are incorporated by reference in their entirety.

TECHNICAL FIELD

The present disclosure relates to a laundry treating apparatus, which is a laundry treating apparatus including a first treating apparatus as an upper treating apparatus and a second treating apparatus as a lower treating apparatus.

BACKGROUND

A laundry treating apparatus is an apparatus that puts laundry such as clothes, bedding, and the like into a drum to perform treatment necessary for the laundry, such as to remove contamination from the laundry or to dry the laundry.

When the laundry treating apparatus is constructed to remove the contamination from the laundry, the laundry treating apparatus may perform processes such as washing, rinsing, dehydration, drying, and the like. The laundry treating apparatuses may be classified into a top loading type laundry treating apparatus and a front loading type laundry treating apparatus based on a scheme of putting the laundry into the drum.

The laundry treating apparatus may include a cabinet defining an appearance of the laundry treating apparatus, a tub accommodated in the cabinet, a drum that is rotatably mounted inside the tub and into which the laundry is put, and a detergent supply that supplies detergent into the drum.

When the drum is rotated by a motor while washing-water is supplied to the laundry accommodated in the drum, dirt on the laundry may be removed by friction with the drum and the washing-water.

The detergent supply has a detergent supply function to improve a washing effect. In this connection, the detergent means a substance, such as fabric detergent, fabric softener, fabric bleach, and the like, that enhances the washing effect. Detergent in a powder form and detergent in a liquid form may be used as the detergent.

In one example, when the laundry treating apparatus is designed to dry the laundry, the laundry treating apparatus may remove moisture from the laundry by supplying dry air to the laundry.

The laundry treating apparatus may include a cabinet, a drum rotatably disposed inside the cabinet, heating means for heating or drying the air supplied to the laundry, and the like.

As the dry air is supplied to the laundry accommodated in the drum, the moisture present in the laundry may be evaporated and removed by the dry air, and water may be removed from the laundry.

In one example, a laundry treating apparatus is equipped with a plurality of treating apparatuses. The laundry treating apparatus includes a first treating apparatus as an upper treating apparatus and a second treating apparatus as a lower treating apparatus. In addition, a structure in which each of the first treating apparatus and the second treating apparatus has a manipulator and a display is disclosed.

However, the laundry treating apparatus discloses the structure in which the plurality of treating apparatuses distinguished from each other have respective manipulators and respective displays. In this case, a user must respectively identify states of the respective plurality of treating apparatuses, and must respectively manipulate the plurality of treating apparatuses. In addition, it may be disadvantageous for the user to operate the plurality of treating apparatuses in association with each other.

Therefore, in the laundry treating apparatus equipped with the plurality of treating apparatuses, it is an important task to improve a convenience of the user in identifying or manipulating the operation states of the plurality of treating apparatuses and to present an efficient arrangement relationship and a stable and effective coupling relationship of components of the plurality of treating apparatuses.

SUMMARY

Implementation of the present disclosure are intended to provide a laundry treating apparatus including an efficient arrangement and coupling structure of a control panel for simultaneously identifying or controlling a plurality of treating apparatuses for treating laundry.

In addition, implementation of the present disclosure are intended to provide a laundry treating apparatus whose structural stability is effectively improved and having excellent coupling stability.

A laundry treating apparatus according to one implementation of the present disclosure is intended to implement a structure in which one control panel capable of controlling a plurality of treating apparatuses may be constructed in a structurally stable manner.

Specifically, the laundry treating apparatus according to one implementation of the present disclosure may include the plurality of treating apparatuses. A first treating apparatus may dry laundry, and a second treating apparatus may wash the laundry.

The first treating apparatus and the second treating apparatus may have a structure stacked together in a vertical direction. That is, the first treating apparatus may be disposed on the second treating apparatus.

Each of the first treating apparatus and the second treating apparatus has a laundry inlet into which the laundry is inserted defined at a front face thereof, and each drum for accommodating therein the laundry inserted into each cabinet through each laundry inlet may be in a front loader form whose rotation axis direction is parallel to a front and rear direction.

A control panel that is signally connected to the first treating apparatus and the second treating apparatus may be disposed between the first treating apparatus and the second treating apparatus. The control panel may define a portion of a front face of the laundry treating apparatus. For example, the control panel may be disposed between a first front panel of the first treating apparatus and a second front panel of the second treating apparatus, so that a front face of the control panel may be exposed frontward.

Particular implementations of the present disclosure provide a laundry treating system that includes first and second treating apparatuses and a control panel. The first treating apparatus has a first front panel and a first drum disposed inside the first treating apparatus and configured to accommodate a first laundry. The second treating apparatus is disposed beneath the first treating apparatus and supports the first treating apparatus. The second treating apparatus has a second front panel and a second drum disposed inside the second treating apparatus and configured to accommodate a second laundry. The control panel is disposed between the first front panel and the second front panel. The control panel is configured to communicate with the first treating apparatus and the second treating apparatus. The control panel is positioned between the first front panel and the second front panel and extends along a first direction between opposite lateral sides of the laundry treating system. The control panel is configured to be slid in the first direction to thereby be fixed between the first front panel and the second front panel, the first direction.

In some implementations, the system can optionally include one or more of the following features. The first treating apparatus may include a lower frame disposed behind the control panel and coupled to the control panel. The lower frame of the first treating apparatus may include a main frame face, a top extension portion, and a bottom extension portion. The main frame face may extend along the first direction. The main frame face may be positioned behind the control panel and define an interior of the first treating apparatus from the control panel. The top extension portion may extend frontward from a top of the main frame face. The bottom extension portion may extend frontward from a bottom of the main frame face. The control panel may be configured to be slid in the first direction to thereby be coupled to the top extension portion and the bottom extension portion. The control panel may include a front face, a top face, and a bottom face. The front face may be exposed from the first treating apparatus. The top face may extend rearward from a top of the front face. The bottom face may extend rearward from a bottom of the front face. The top face and the bottom face may be configured to, based on the control panel being slid in the first direction, be respectively coupled to the top extension portion and the bottom extension portion. The top face of the control panel may be disposed between the top extension portion of the lower frame and the first front panel. The bottom face of the control panel may be disposed between the bottom extension portion of the lower frame and the second front panel. The top face and the bottom face of the control panel may include sliding couplers protruding toward the top extension portion and the bottom extension portion of the lower frame, respectively. The top extension portion and the bottom extension portion of the lower frame may include sliding coupling grooves. The sliding couplers of the control panel may be configured to, based on the control panel being slid in the first direction, be inserted into the sliding coupling grooves of the lower frame. Each of the sliding coupling grooves of the lower frame may include a first extension portion extending rearward from a front end of each of the sliding coupling grooves and being forwardly opened. Each of the sliding couplers of the control panel may be configured to be inserted rearwardly into the first extension portion. Each of the sliding coupling grooves of the lower frame may include a second extension portion having a first end connected to a rear end of the first extension portion, and an opposite second end extending in the first direction from the first end. Each of the sliding couplers may be configured to be slid in the first direction within the second extension portion. Each of the sliding couplers of the control panel may include a sliding protrusion protruding toward each of the top extension portion and the bottom extension portion. The sliding protrusion may be configured to be inserted into and slid in each of the sliding coupling grooves of the lower frame. Each of the sliding couplers of the control panel may include a sliding support extending rearward from the sliding protrusion and supporting an inner face of each of the top extension portion and the bottom extension portion of the lower frame. A rear end of the sliding support of the control panel may include a sliding contact portion configured to contact the inner face of each of the top extension portion and the bottom extension portion of the lower frame. The lower frame may include side end extension portions respectively extending frontward from opposite lateral ends of the main frame face. The control panel may include side faces extending rearward from opposite lateral ends of the front face of the control panel. The side faces of the control panel may be respectively coupled to the side end extension portions of the lower frame. The side faces of the control panel may include a first side face disposed at a first lateral end of the front face of the control panel. The side end extension portion of the lower frame may include a first side end extension portion disposed at a first lateral end of the main frame face and facing an inner face of the first side face. The first side face of the control panel may include a sliding hook protruding from the inner face of the first side face toward the first side end extension portion and inserted into the first side end extension portion. The first side end extension portion of the lower frame may include a sliding hook groove penetrating the first side end extension portion in the first direction and facing the sliding hook. The sliding hook may be configured to be slid in the first direction and inserted into the sliding hook groove. The sliding hook of the control panel may include a sliding extension extending along a second direction perpendicular to the first direction, and a sliding engagement portion protruding in a vertical direction from the sliding extension. The sliding hook groove of the lower frame may have a shape corresponding to a shape of the sliding hook of the control panel. The sliding hook of the control panel may be configured to be inserted into and slid in the sliding hook groove of the lower frame. At least a portion of the sliding hook of the control panel may be spaced apart from the inner face of the first side face of the control panel and define an extension insertion space. The first side end extension portion of the lower frame may be configured to be inserted into the extension insertion space of the control panel. The sliding hook of the control panel may be configured to be inserted into and slid in the first direction within the first side end extension portion of the lower frame based on the first side end extension portion of the lower frame being inserted into the extension insertion space of the control panel. The first side end extension portion of the lower frame may be positioned within the extension insertion space of the control panel based on the sliding coupler of the control panel being positioned within the first extension portion of the lower frame. The sliding hook of the control panel may be positioned within the sliding hook groove of the lower frame based on the sliding coupler of the control panel being positioned within the second extension portion of the lower frame. The side faces of the control panel may include a second side face disposed at a second lateral end of the front face of the control panel. The side end extension portion of the lower frame may include a second side end extension portion disposed at a second lateral end of the main frame face and facing an inner face of the second side face. The laundry treating system may include a penetrating member configured to couple the second side face of the control panel with the second side end extension portion of the lower frame by penetrating the second side face of the control panel and being coupled to a penetration coupler defined in the second side end extension portion of the lower frame. The second side face of the control panel may be configured to contact the second side end extension portion of the lower frame based on the sliding coupler being positioned at the second end of the second extension portion of the lower frame. The first treating apparatus may include opposing first side panels, and the second treating apparatus may include opposing second side panels that are flush with the first side panels.

One implementation of the present disclosure may control the first treating apparatus and the second treating apparatus through one control panel. The control panel may include a display for displaying operation states of the first treating apparatus and the second treating apparatus, and a manipulator for a user to control the first treating apparatus and the second treating apparatus.

In one example, in a state of being inserted between the first front panel and the second front panel, the control panel may slide along the lateral direction and be fixed. The first treating apparatus or the second treating apparatus may have fixing means for fixing the control panel after the control panel is inserted and slides.

In one implementation of the present disclosure, because the control panel connected to both of the first treating apparatus and the second treating apparatus is coupled and fixed in a sliding scheme, the control panel may be provided to a user by being stably fixed through a simple process.

A lower frame may be constructed in the first treating apparatus, and the control panel may be coupled to a top extension portion and a bottom extension portion of the lower frame. A sliding coupling groove through which a sliding coupler of the control panel is inserted and slid may be defined in each of the top extension portion and bottom extension portion of the lower frame.

The sliding coupling groove has a first extension portion extending in a front and rear direction and a second extension portion extending in a lateral direction. The sliding coupler of the control panel may be inserted into the sliding coupling groove in the front and rear direction through the first extension portion and slide in the lateral direction in the second extension portion.

In one example, the lower frame may include a panel fastening portion or a panel support that is upwardly coupled with the first front panel or supports the first front panel. That is, in one implementation of the present disclosure, a coupling structure between the control panel, the lower frame, and the first front panel may be defined.

In an aspect of the present disclosure, a laundry treating apparatus includes a first treating apparatus and a second treating apparatus. The first treating apparatus has a first front panel disposed on a front face thereof and a first drum disposed therein for accommodating laundry, and a second treating apparatus is disposed beneath the first treating apparatus to support the first treating apparatus and the second treating apparatus has a second front panel disposed on a front face thereof and a second drum disposed therein for accommodating the laundry.

In one implementation, a control panel is inserted between the first front panel and the second front panel, the control panel is signally connected to the first treating apparatus and the second treating apparatus, and the control panel is inserted between the first front panel and the second front panel and is fixed by sliding in a lateral direction.

In one implementation, the first treating apparatus may include a lower frame disposed at the rear of the control panel and coupled to the control panel.

In one implementation, the lower frame may include a main frame face extending along the lateral direction of the first treating apparatus, wherein the main frame face is positioned at the rear of the control panel to divide an interior of the first treating apparatus and the control panel from each other, a top extension portion extending frontward from a top of the main frame face, and a bottom extension portion extending frontward from a bottom of the main frame face, and the control panel may slide in the lateral direction to be coupled to the top extension portion and the bottom extension portion.

In one implementation, the control panel may include a front face forwardly exposed from the first treating apparatus, a top face extending rearward from a top of the front face, and a bottom face extending rearward from a bottom of the front face, and the top face and the bottom face may slide to be respectively coupled to the top extension portion and the bottom extension portion respectively facing the top face and the bottom face.

In one implementation, the top face may be disposed between the top extension portion and the first front panel, and the bottom face may be disposed between the bottom extension portion and the second front panel.

In one implementation, the top face and the bottom face may respectively include sliding couplers respectively protruding toward the top extension portion and the bottom extension portion respectively facing the top face and the bottom face, and the top extension portion and the bottom extension portion may respectively include sliding coupling grooves, wherein the sliding couplers are respectively inserted into the sliding coupling grooves and slid in the lateral direction.

In one implementation, each sliding coupling groove may include a first extension portion extending rearward from a front end thereof forwardly opened, wherein each sliding coupler is rearwardly inserted into the first extension portion, and a second extension portion having one end connected to a rear end of the first extension portion, and an opposite end to said one end extending in the lateral direction from said one end, wherein each sliding coupler slides in the lateral direction within the second extension portion.

In one implementation, each sliding coupler may include a sliding protrusion protruding toward each of the top extension portion and the bottom extension portion facing the sliding protrusion, wherein the sliding protrusion is inserted into and slides in each sliding coupling groove, and a sliding support extending rearward from the sliding protrusion to support an inner face of each of the top extension portion and the bottom extension portion facing the sliding support.

In one implementation, a sliding contact portion protruding to be in contact with the inner face of each of the top extension portion and the bottom extension portion may be disposed at a rear end of each sliding support.

In one implementation, the lower frame may further include side end extension portions respectively extending frontwards from both ends in the lateral direction of the main frame face, and the control panel may further include side faces respectively extending rearwards from both ends in the lateral direction of the front face, wherein the side faces are respectively coupled to the side end extension portions respectively facing the side faces.

In one implementation, the side faces may include a first side face disposed at one end in the lateral direction of the front face, the side end extension portion may include a first side end extension portion disposed at one end in the lateral direction of the main frame face and facing an inner face of the first side face, and the first side face may include a sliding hook protruding from the inner face of the first side face toward the first side end extension portion and inserted into the first side end extension portion.

In one implementation, the first side end extension portion may include a sliding hook groove penetrating the first side end extension portion in the lateral direction and defined to face the sliding hook, wherein the sliding hook slides in the lateral direction and is inserted into the sliding hook groove.

In one implementation, the sliding hook may include a sliding extension extending along a front and rear direction, and a sliding engagement portion protruding in a vertical direction from the sliding extension, and the sliding hook may be inserted into and slides in the sliding hook groove.

In one implementation, at least a portion of the sliding hook may be spaced apart from the inner face of the first side face to define an extension-inserted space, wherein the first side end extension portion is inserted into the first side end extension portion, and the sliding hook may be inserted into and slides in the lateral direction within the first side end extension portion while the first side end extension portion is inserted into the extension-inserted space.

In one implementation, the first side end extension portion may be positioned within the extension-inserted space while the sliding coupler of the control panel is positioned within the first extension portion.

In one implementation, the sliding hook of the control panel may be positioned within the sliding hook groove while the sliding coupler is positioned within the second extension portion.

In one implementation, the side faces may include a second side face disposed at the other end in the lateral direction of the front face, and the side end extension portion may include a second side end extension portion disposed at the other end in the lateral direction of the main frame face and facing an inner face of the second side face.

In one implementation, the laundry treating apparatus may further include a penetrating member for coupling the second side face and the second side end extension portion with each other by penetrating the second side face and being coupled to a penetrated coupler defined in the second side end extension portion.

In one implementation, the second side face of the control panel may be in contact with the second side end extension portion while the sliding coupler is positioned at the other end of the second extension portion.

Implementations of the present disclosure are intended to provide the laundry treating apparatus including the efficient arrangement and coupling structure of the control panel for simultaneously identifying or controlling the plurality of treating apparatuses for treating the laundry.

In addition, implementations of the present disclosure may provide the laundry treating apparatus whose structural stability is effectively improved and having the excellent coupling stability.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
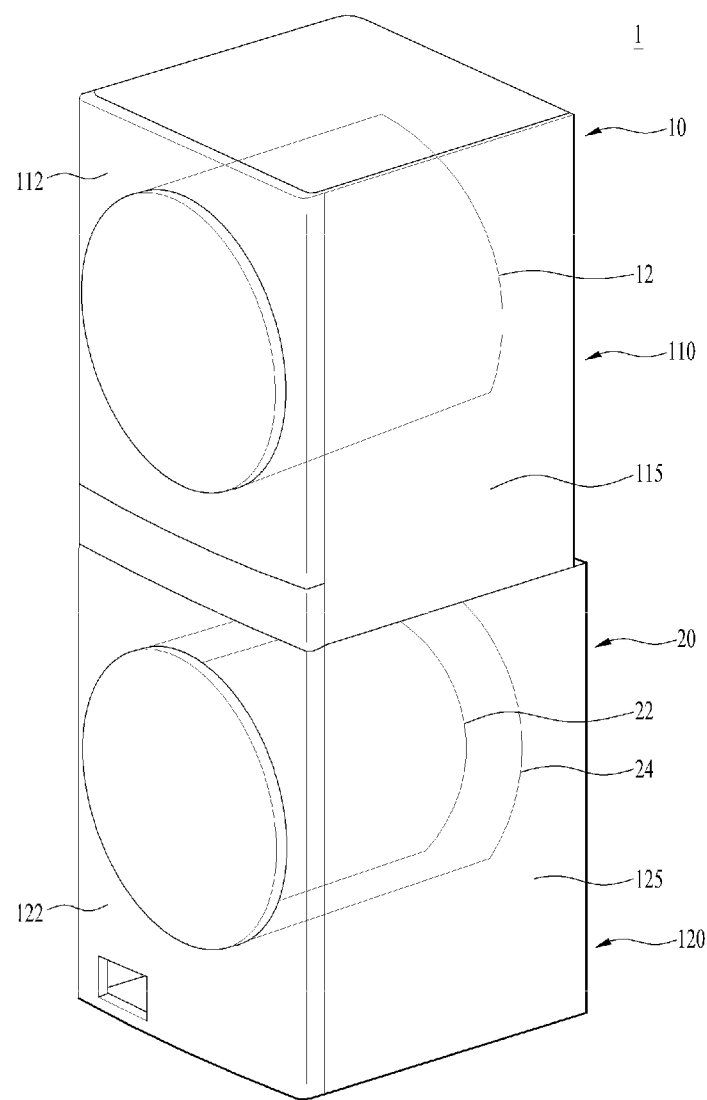
FIG. 1 is a perspective view showing a laundry treating apparatus according to one implementation of the present disclosure.

For simplicity and clarity of illustration, elements in the figures are not necessarily drawn to scale. The same reference numbers in different figures denote the same or similar elements, and as such perform similar functionality. Furthermore, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a laundry treating apparatus 1 according to an embodiment of the present disclosure. In one implementation of the present disclosure, the laundry treating apparatus 1 includes a first treating apparatus 10 and a second treating apparatus 20. The first treating apparatus 10 and the second treating apparatus 20 may be in various types for treating laundry, such as a washing machine for washing the laundry or a dryer for drying the laundry.

For example, the first treating apparatus 10 as an upper treating apparatus in FIG. 1, which is a dryer for drying the laundry, may have a first drum 12 disposed therein. The second treating apparatus 20 that is located beneath the first treating apparatus 10 and supports the first treating apparatus 10 may correspond to the washing machine for washing the laundry, and may have a second drum 22 and a tub 24 arranged therein. When the second treating apparatus 20 corresponds to the laundry washing machine, the second drum 22 inside the second treating apparatus 20 may be rotatably disposed inside the tub 24.

However, in one implementation of the present disclosure, the first treating apparatus 10 and the second treating apparatus 20 are not necessarily limited to the above types. When necessary, both the first treating apparatus 10 and the second treating apparatus 20 may be the washing machines or the dryers. In addition, the first treating apparatus 10 may be the washing machine, and the second treating apparatus 20 may be the dryer. The first treating apparatus 10 and the second treating apparatus 20 may be various apparatuses for treating the laundry.

The first treating apparatus 10 may include a first cabinet 110 defining an appearance thereof, and the first cabinet 110 may have a first front panel 112 on a front face thereof. A laundry inlet in communication with the first drum 12 may be defined in the first front panel 112, and the laundry inlet may be opened and closed by a cabinet door.

In addition, the first treating apparatus 10 may have each first side panel 115 on each of both faces thereof in a lateral direction Y, a first rear panel on a rear face thereof, a first top panel on a top face thereof, and a first bottom panel on a bottom face thereof.

The first front panel 112, the first side panels 115, the first rear panel, the first top panel, and the first bottom panel may define the first cabinet 110 together, and have a coupling relationship with each other, and define a space in which internals constituting the first treating apparatus 10 such as the first drum 12 are arranged.

In the first treating apparatus 10, the laundry requiring the treatment and the like may be inserted into the first cabinet 110 through the laundry inlet and accommodated in the first drum 12, and a treating process by the first treating apparatus 10 such as washing, drying, and the like may be performed.

According to one implementation of the present disclosure, FIG. 1 illustrates the first treating apparatus 10 in which the laundry inlet is defined in the first front panel 112 along with the cabinet door, and the first drum 12 has a rotation axis parallel to a front and rear direction X.

However, the laundry inlet may not be necessarily limited to being defined in the first front panel 112, and may be defined in the first side panel 115, the first top panel, or the like together with the cabinet door. For example, the first treating apparatus 10 may be a front loader type or a top loader type.

In one example, the second treating apparatus 20 may include a second cabinet 120 defining an appearance thereof, and the second cabinet 120 may have a second front panel 122 on a front face thereof. A laundry inlet in communication with the second drum 22 may be defined in the second front panel 122, and the laundry inlet may be opened and closed by a cabinet door.

In addition, the second treating apparatus 20 may have each second side panel 125 on each of both faces thereof in the lateral direction Y, a second rear panel on a rear face thereof, a second top panel on a top face thereof, and a second bottom panel on a bottom face thereof.

The second front panel 122, the second side panels 125, the second rear panel, the second top panel, and the second bottom panel may form the second cabinet 120 together, and have a coupling relationship with each other, and define a space in which internals constituting the second treating apparatus 20 such as the second drum 22 and the tub 24 are arranged.

In the second treating apparatus 20, the laundry requiring the treatment and the like may be inserted into the second cabinet 120 through the laundry inlet and accommodated in the second drum 22, and a treating process by the second treating apparatus 20 such as the washing, the drying, and the like may be performed.

According to an embodiment of the present disclosure, FIG. 1 illustrates the second treating apparatus 20 in which the laundry inlet is defined in the second front panel 122 along with the cabinet door, and the second drum 22 has a rotation axis parallel to the front and rear direction X.

However, the laundry inlet may not be necessarily limited to being defined in the second front panel 122, and may be defined in the second side panel 125, the second top panel, or the like together with the cabinet door. For example, the second treating apparatus 20 may be the front loader type or the top loader type.

For example, the laundry inserted through the first front panel 112 may be accommodated in the first drum 12 to perform the washing, the drying or other treating processes, and the laundry inserted through the second front panel 122 may be accommodated in the second drum 22 to perform the washing, the drying, or other treating processes.

The first treating apparatus 10 may be disposed on the second treating apparatus 20, and thus, the second treating apparatus 20 may have a structure supporting the first treating apparatus 10 upward. For example, the second top panel of the second treating apparatus 20 may have a structure of directly or indirectly supporting the first bottom panel of the first treating apparatus 10, and a bottom of the first treating apparatus 10 may be coupled with a top of the second treating apparatus 20.

In one example, in one implementation of the present disclosure, a control panel 200 may be disposed between the first front panel 112 and the second front panel 122. The control panel 200 may be disposed between the first front panel 112 and the second front panel 122, and may be signally connected to at least one of the first treating apparatus 10 and the second treating apparatus 20.

The control panel 200 may have a front face 210, and side faces 240 on both sides in the lateral direction Y. The side face 240 may include a first side face 242 on one side in the lateral direction Y and a second side face 244 on the other side.

The control panel 200 may have a top face 220 and a bottom face 230. The front face 210, the side faces 240, the top face 220, and the bottom face 230 may be connected to each other. For example, the side faces 240, the top face 220, and the bottom face 230 may have a shape extending rearward from the front face 210.

The front face 210 of the control panel 200 may be exposed to the outside to define a front face of the laundry treating apparatus 1 according to one implementation of the present disclosure together with the first front panel 112 and the second front panel 122. The side face 240 of the control panel 200 may be exposed to the outside in the lateral direction Y, and the top face 220 and the bottom face 230 thereof may be inserted between the first front panel 112 and the second front panel 122 and may not be exposed to the outside.

The control panel 200 may be signally connected to at least one of the first treating apparatus 10 and the second treating apparatus 20. The control panel 200 may include a display capable of indicating states of the first treating apparatus 10 and/or the second treating apparatus 20 disposed on the front face 210 thereof, and the first treating apparatus 10, and a receiver capable of inputting operation commands of the first treating apparatus 10 and/or the second treating apparatus 20.

Electric parts may be arranged inside the control panel 200, that is, on a rear face of the front face 210. The electric parts may be electrically connected to the first treating apparatus 10 and/or the second treating apparatus 20 and may exchange state information or control signals.

For example, the electric parts may include a controller of the first treating apparatus 10 and a controller of the second treating apparatus 20, may include an integrated controller that controls the first treating apparatus 10 and the second treating apparatus 20 together, may include a panel controller connected to the controller of the first treating apparatus 10 and the controller of the second treating apparatus 20 in a control manner, or may be controlled by the controller of the first treating apparatus 10 and the controller of the second treating apparatus 20 without a separate controller.

The control panel 200 may include a rear face, but in one implementation of the present disclosure, the rear face of the control panel 200 may be opened. The control panel 200 disposed between the first front panel 112 and the second front panel 122 may be positioned at a lower portion of the first treating apparatus 10 or at an upper portion of the second treating apparatus 20.

Figure 2:
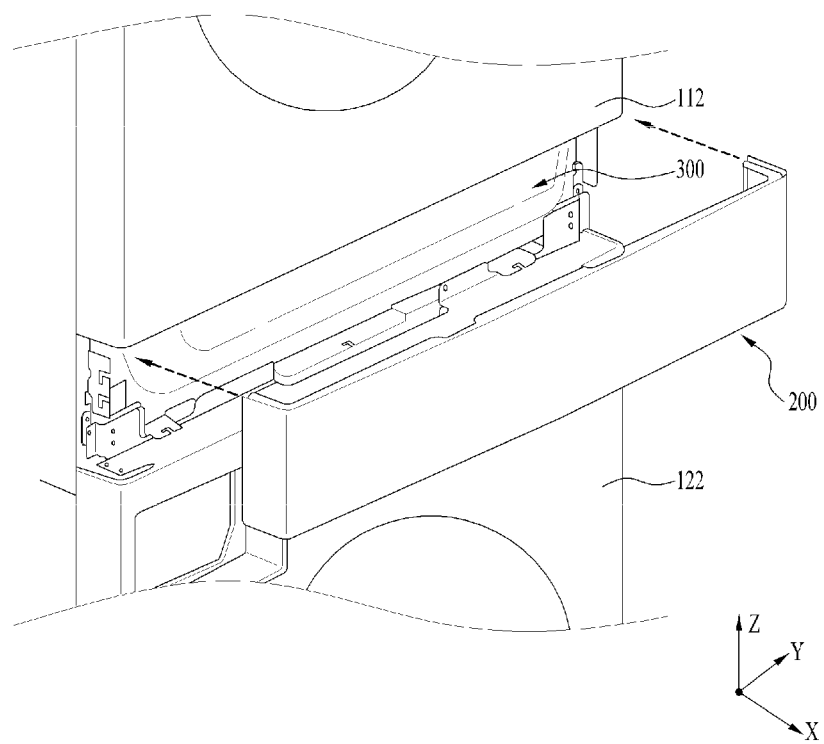
FIG. 2 is a diagram showing a state in which a control panel is inserted between a first front panel and a second front panel in a laundry treating apparatus according to one implementation of the present disclosure.
Figure 3:
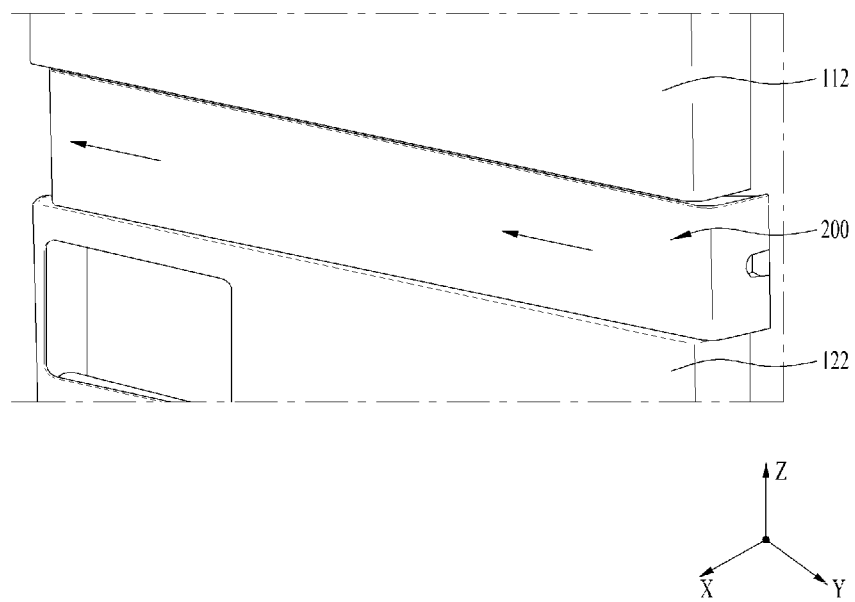
FIG. 3 is a diagram showing a state in which a control panel in FIG. 2 is inserted between first and second front panels and slid.
Figure 4:
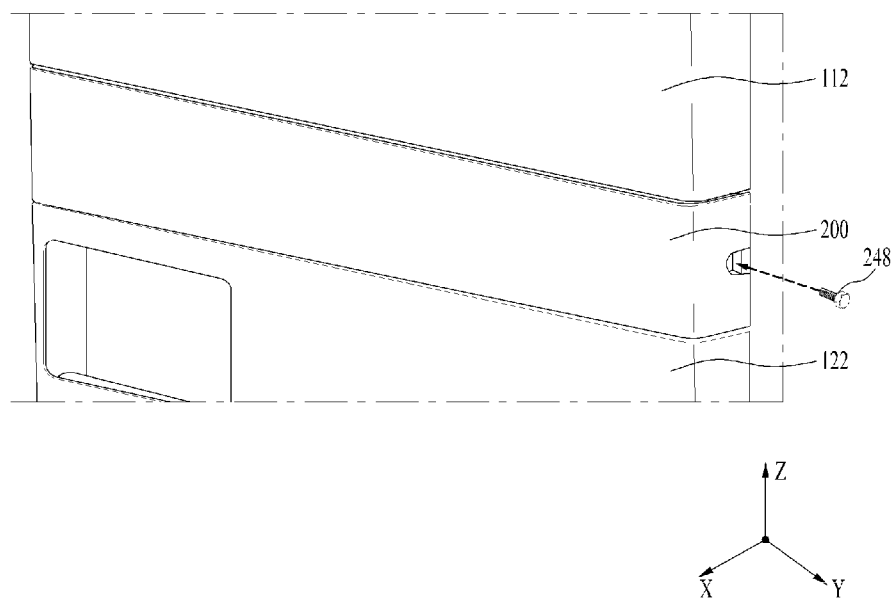
FIG. 4 is a diagram showing a state in which a control panel in FIG. 3 has completely slid and been coupled.

In one example, FIG. 2 shows the control panel 200 before being inserted between the first front panel 112 and the second front panel 122 according to one implementation of the present disclosure. FIG. 3 shows a state of the control panel 200 in FIG. 2 before being inserted between the first front panel 112 and the second front panel 122. FIG. 4 shows a state in which the control panel 200 in FIG. 3 has been slid along the lateral direction Y.

In one implementation of the present disclosure, the control panel 200 may be inserted between the first front panel 112 and the second front panel 122, and may be slid in the lateral direction Y and be fixed.

Referring to FIG. 2, the control panel 200 may be primarily moved along the front and rear direction X and be inserted between the first front panel 112 and the second front panel 122. In one implementation of the present disclosure, the control panel 200 may include a single control panel because the control panel 200 is connected to both of the first treating apparatus 10 and the second treating apparatus 20 in a control manner.

A bottom of the first front panel 112 and a top of the second front panel 122 may be spaced apart from each other, and the control panel 200 may be inserted between the first front panel 112 and the second front panel 122. FIG. 2 shows a state in which the control panel 200 is inserted rearward into the space defined by the bottom of the first front panel 112 and top of the second front panel 122 according to one implementation of the present disclosure. In the state in which the control panel 200 is inserted between the first front panel 112 and the second front panel 122, the first front panel 112 and the second front panel 122 may be connected to each other through the control panel 200.

In other words, the first front panel 112, the second front panel 122, and the control panel 200 may be coplanar with each other and connected to each other, and may define the front face of the laundry treating apparatus 1 according to one implementation of the present disclosure.

In one example, FIG. 3 shows the state of the control panel 200 that is inserted between the first front panel 112 and the second front panel 122, but not slid yet.

As shown in FIG. 3, the control panel 200 inserted between the first front panel 112 and the second front panel 122 may be coplanar with the first front panel 112 and the second front panel 122 along the vertical direction Z.

However, in one implementation of the present disclosure, the control panel 200 is coupled to a lower front portion of the first treating apparatus 10 through a sliding process, so that, as shown in FIG. 3, the control panel 200 before the sliding may be positioned such that one end thereof in the lateral direction Y protrudes in the lateral direction Y than one end of the first front panel 112 in the lateral direction Y and/or one end of the second front panel 122 in the lateral direction Y.

The control panel 200 may be disposed such that one end in the lateral direction Y thereof protrudes in the lateral direction Y than one end of the first front panel 112 in the lateral direction Y and/or one end of the second front panel 122 in the lateral direction Y, and the other end thereof in the lateral direction Y is recessed in the lateral direction Y than the other end of the first front panel 112 in the lateral direction Y and/or the other end of the second front panel 122 in the lateral direction Y. While going through the sliding process, one end and the other end in the lateral direction Y of the control panel 200 may be respectively coplanar with respective one ends and respective the other ends of the first front panel 112 and the second front panel 122 as shown in FIG. 4.

That is, the control panel 200 may be coupled to the laundry treating apparatus 1 according to one implementation of the present disclosure while going through the insertion and the sliding processes. In one implementation of the present disclosure, because the control panel 200 is fixed through the insertion and the sliding processes, convenience of coupling of the control panel 200 may be improved, unintentional separation of the control panel 200 may be prevented, and removal and re-installation of the control panel 200 are easy when necessary.

Figure 5:
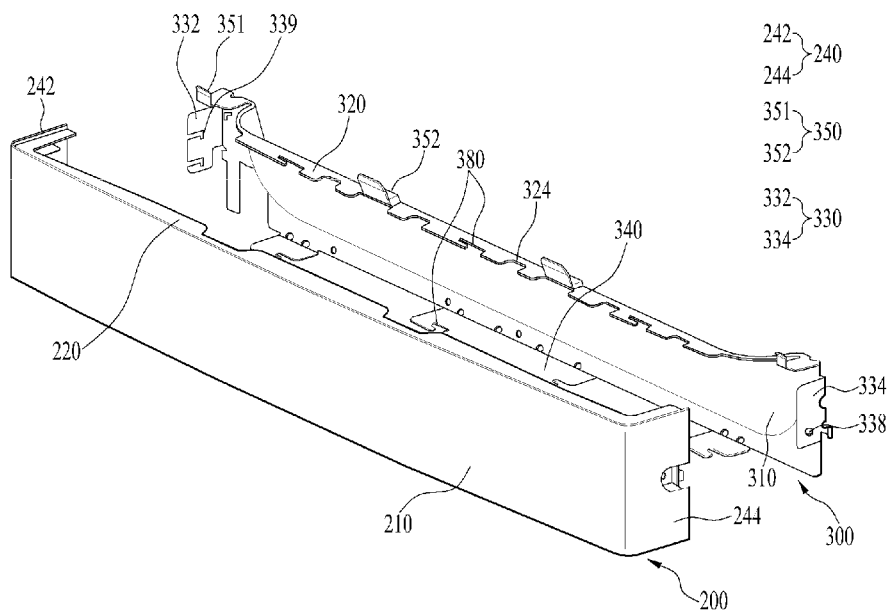
FIG. 5 is a diagram showing a control panel and a lower frame in a laundry treating apparatus according to one implementation of the present disclosure.

In one example, FIG. 2 shows the lower frame 300 disposed on the lower front portion of the first treating apparatus 10 according to one implementation of the present disclosure, and FIG. 5 shows a perspective view of the lower frame 300 and the control panel 200.

As shown in FIGS. 2 to 5, in one implementation of the present disclosure, the first treating apparatus 10 may include the lower frame 300. The lower frame 300 may be disposed at the rear of the control panel 200, and the control panel 200 may be coupled to the lower frame 300.

The lower frame 300 may be a fixed component in the first treating apparatus 10. For example, the lower frame 300 may be coupled to the first side panels 115 and/or the first front panel 112 of the first cabinet 110.

The control panel 200 may be primarily coupled to the lower frame 300 while being inserted between the first front panel 112 and the second front panel 122 along the front and rear direction X, and secondarily coupled to the lower frame 300 while being slid in the lateral direction Y, so that the control panel 200 may be fixed to the lower frame 300.

That is, the control panel 200 is coupled to the lower frame 300, which is constructed to be fixed to the first cabinet 110 in position, through the movements in the front and rear direction X and the lateral direction Y. Accordingly, the control panel 200 may be coupled and fixed to the first treating apparatus 10 through the lower frame 300.

In one implementation of the present disclosure, the first treating apparatus 10 and the second treating apparatus 20 are arranged together such that a user may perform an efficient laundry treating process, and one control panel 200 for efficient operation of the first treating apparatus 10 and the second treating apparatus 20 is disposed between the first front panel 112 and the second front panel 122 to improve case of use.

In addition, as described above, the lower frame 300 disposed at the rear of the control panel 200 is disposed at the lower portion of the first treating apparatus 10 such that the control panel 200 disposed between the first front panel 112 and the second front panel 122 may be stably fixed and used. In addition, the lower frame 300 and the control panel 200 are coupled to each other, so that the control panel 200 may be effectively and stably coupled and fixed.

In the present disclosure, the components may have the front and rear directions X parallel to each other, the left and right directions Y parallel to each other, and the vertical directions Z. For example, the front and rear direction X of the first treating apparatus 10 may be defined identically to the front and rear directions X of the second treating apparatus 20, the control panel 200, the lower frame 300, and the like. In addition, the left and right directions Y and the vertical directions Z may also be defined as in the above scheme.

Referring to FIG. 2, in one implementation of the present disclosure, both side faces in the lateral Y of the lower frame 300 may be respectively coupled to the first side panels 115 respectively facing toward the both side faces of the lower frame 300.

The both side faces in the lateral direction Y of the lower frame 300 may be respectively coupled to the first side panels 115. The lower frame 300 may be disposed at the lower portion of the front face of the first treating apparatus 10, and the both side faces in the lateral direction Y thereof may respectively face toward the first side panels 115 at the rear of the first side panels 115.

Each first side panel 115 may include a front end bent portion extending in the lateral direction Y from a front end thereof, and the lower frame 300 may be coupled to the front end bent portions of the first side panels 115. As for a coupling scheme, various schemes such as screw coupling, rivet coupling, fitting coupling, and the like may be used.

In one implementation of the present disclosure, the lower frame 300 has the both side faces in the lateral direction Y respectively coupled to the first side panels 115, and the control panel 200 disposed on the front face of the apparatus is coupled to the lower frame 300, so that the control panel 200 that may be connected with the first treating apparatus 10 and the second treating apparatus 20 between the first front panel 112 and the second front panel 122 may have the stable fixing structure.

In one example, referring to FIG. 5, the lower frame 300 may include a main frame face 310, a top extension portion 320, and a bottom extension portion 340, and the control panel 200 may be slid in the lateral direction Y and fixed to the top extension portion 320 and the bottom extension portion 340.

The main frame face 310 extends along the lateral direction Y of the first treating apparatus 10 and may divide an interior of the first treating apparatus 10 from the control panel 200.

Specifically, the main frame face 310 of the lower frame 300 may be disposed coplanar with the front face 210 of the control panel 200. The main frame face 310 may extend in the lateral direction Y, so that both ends thereof may be respectively coupled to the first side panels 115.

The main frame face 310 may be disposed between the interior of the first treating apparatus 10 and an interior of the control panel 200 to divide the interior of the first treating apparatus 10 from the interior of the control panel 200. Inside the first treating apparatus 10, various internals may be arranged, and there may be a large amount of water or a high-temperature air current as needed. In a process of using the first treating apparatus 10, unintended leak may occur, or the air current may affect the process.

Accordingly, one implementation of the present disclosure may minimize influence of the water or a temperature change inside the first treating apparatus 10 on the control panel 200 as the lower frame 300 includes the main frame face 310 that divides the control panel 200 from the interior of the first treating apparatus 10.

The main frame face 310 may have various shapes as needed, and as shown in FIG. 5, may include a convex portion to secure a space in which the internals of the first treating apparatus 10 are arranged and effectively divide the control panel 200 from the interior of the first treating apparatus 10.

In one example, in one implementation of the present disclosure, a connection hole through which a signal connection line for signally connecting the first treating apparatus 10 with the control panel 200 passes may be defined in the main frame face 310.

The above-described electric parts may be arranged inside the control panel 200, and the electric parts may be connected to a sensor, a motor, the controller of first treating apparatus 10, or the like disposed inside the first treating apparatus 10.

To this end, the signal connection line may extend from the interior of the first treating apparatus 10 to the electric parts of the control panel 200, and signal connection between components of the first treating apparatus 10 and the control panel 200 may be achieved by the signal connection line.

In one example, the control panel 200 may be fixed by the lower frame 300, and the lower frame 300 may include the main frame face 310 that divides the control panel 200 from the interior of the first treating apparatus 10, so that the connection hole through which the signal connection line may pass may be defined in the main frame face 310.

The signal connection line may have various shapes. For example, the signal connection line may include a connection jack or a connection port, and may be connected to the electric parts through the connection hole.

There may also be various positions and shapes of the connection hole. FIG. 5 is a front view showing the lower frame 300 according to one implementation of the present disclosure. Referring to FIG. 5, the connection hole may be defined on one side in the lateral direction Y of the main frame face 310, and may be defined on a lower side of said one side such that the signal connection line may be effectively connected to the electric parts.

In one example, the top extension portion 320 may extend frontward from the top of the main frame face 310 and may be positioned below the first front panel 112. The top extension portion 320 may extend along the lateral direction Y like the main frame face 310, and may extend frontward from the main frame face 310.

The top extension portion 320 may be bent frontward from the main frame face 310. That is, the main frame face 310 and the top extension portion 320 may be integrally formed.

The bottom extension portion 340 may extend frontward from a bottom of the main frame face 310, and may be positioned above the second front panel 122. The bottom extension portion 340 may extend along the lateral direction Y like the main frame face 310.

Like the top extension portion 320, the bottom extension portion 340 may be bent frontward from the main frame face 310. That is, the main frame face 310, the top extension portion 320, and the bottom extension portion 340 may be integrally formed.

The control panel 200 may be coupled to the top extension portion 320 and the bottom extension portion 340 in the lower frame 300 extending frontward from the main frame face 310. That is, the control panel 200 may be slid in the lateral direction Y and fixed to the top extension portion 320 and the bottom extension portion 340.

In one example, as described above, the control panel 200 may include a front face 210 forwardly exposed from the first treating apparatus 10, a top face 220 extending rearward from a top of the front face 210, and a bottom face 230 extending rearward from a bottom of the front face 210. The top face 220 and the bottom face 230 may be slid and respectively coupled to the top extension portion 320 and the bottom extension portion 340 respectively facing thereto.

In the state in which the control panel 200 is inserted between the first front panel 112 and the second front panel 122, the top extension portion 320 and the bottom extension portion 340 extending frontward from the main frame face 310 may be respectively disposed to face the top face 220 and the bottom face 230 of the control panel 200.

In the state in which the top face 220 and the bottom face 230 of the control panel 200 respectively face the top extension portion 320 and the bottom extension portion 340, as the control panel 200 slides in the lateral direction Y, the top face 220 may be coupled to the top extension portion 320 and the bottom face 230 may be coupled to the bottom extension portion 340.

In one example, in one implementation of the present disclosure, the top face 220 may be disposed between the top extension portion 320 and the first front panel 112, and the bottom face 230 may be disposed between the bottom extension portion 340 and the second front panel 122.

In other words, in the state in which the control panel 200 is positioned between the first front panel 112 and the second front panel 122, the top extension portion 320 of the lower frame 300 is positioned to face an inner face of the top face 220 of the control panel 200, and the bottom extension portion 340 is positioned to face an inner face of the bottom face 230.

The top extension portion 320 and the bottom extension portion 340 of the lower frame 300 may be located inside of the control panel 200.

Figure 6:
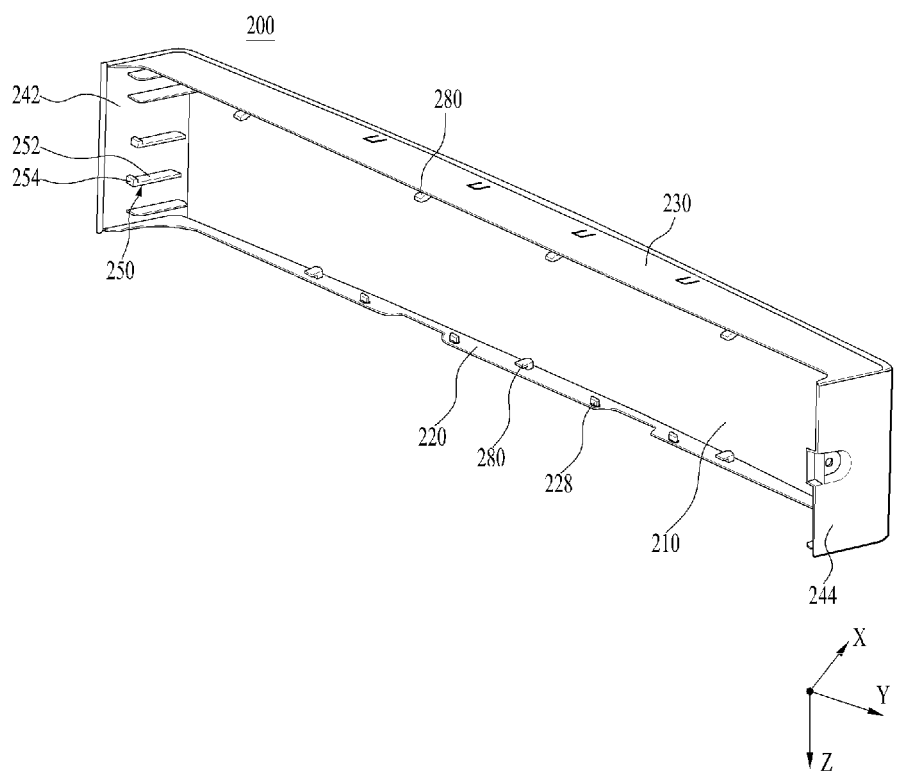
FIG. 6 is a perspective view of a control panel viewed from the rear in a laundry treating apparatus according to one implementation of the present disclosure.

In one example, FIG. 5 shows a sliding coupling groove 380 defined in each of the top extension portion 320 and the bottom extension portion 340 of the lower frame 300 according to one implementation of the present disclosure, and FIG. 6 shows a sliding coupler 280 disposed on the control panel 200.

Referring to FIGS. 5 and 6, in the laundry treating apparatus 1 according to one implementation of the present disclosure, each of the top face 220 and the bottom face 230 of the control panel 200 includes the sliding coupler 280 protruding toward the top extension portion 320 or the bottom extension portion 340 respectively facing thereto, and each of the top extension portion 320 and the bottom extension portion 340 may include the sliding coupling groove 380 into which each sliding coupler 280 is inserted and slid.

The sliding coupler 280 may be disposed on an inner face of each of the top face 220 and the bottom face 230. That is, the sliding couplers 280 may be respectively disposed on a bottom face of the top face 220 and a top face of the bottom face 230. The sliding coupler 280 disposed on the top face 220 may protrude downward from the top face 220, and the sliding coupler 280 disposed on the bottom face 230 may protrude upward from the bottom face 230.

The sliding coupler 280 protruding downward from the top face 220 may be coupled to the top extension portion 320 located below the top face 220, and the sliding coupler 280 protruding upward from the bottom face 230 may be coupled to the bottom extension portion 340 located above the bottom face 230.

In one example, the sliding coupling groove 380 into which the sliding coupler 280 is inserted may be defined in each of the top extension portion 320 and the bottom extension portion 340. The sliding coupler 280 may slide while being inserted into the sliding coupling groove 380.

Therefore, as the control panel 200 is inserted between the first front panel 112 and the second front panel 122 and slid, the sliding coupler 280 of each of the top face 220 and the bottom face 230 is inserted into the sliding coupling groove 380 of each of the top extension portion 320 and the bottom extension portion 340 and slid, so that the control panel 200 may be fixed.

Figure 7:
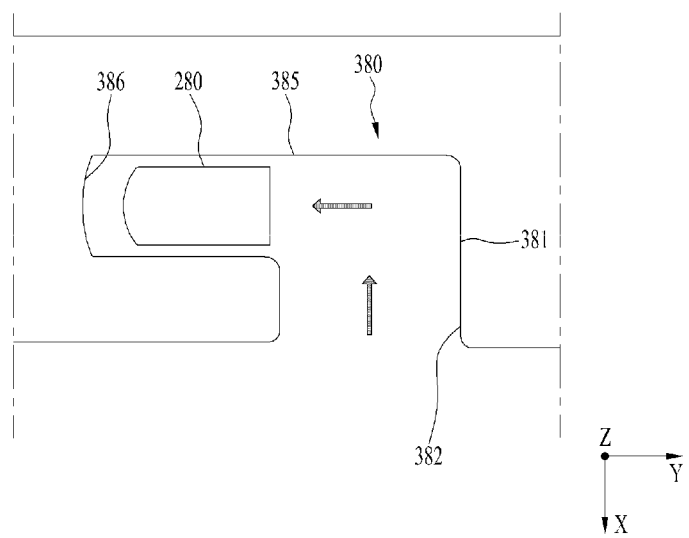
FIG. 7 is a schematic diagram of a sliding coupler that moves within a sliding coupling groove in a laundry treating apparatus according to one implementation of the present disclosure.

In one example, FIG. 7 shows the sliding coupling groove 380 according to one implementation of the present disclosure. Referring to FIG. 7, in one implementation of the present disclosure, the sliding coupling groove 380 may include a first extension portion 381 and a second extension portion 385.

The first extension portion 381 extends rearward from a front end 382 forwardly opened, so that the sliding coupler 280 may be inserted into the first extension portion 381 and moved along the front and rear direction X. In the second extension portion 385, one end may be connected to a rear end of the first extension portion 381, and the other end 386 may extend from the one end in the lateral direction Y, so that the sliding coupler 280 may slide in the lateral direction Y.

In the sliding coupling groove 380, one end of the second extension portion 385 may be connected to a rear end of the first extension portion 381 extending rearward from the open front end 382 of the first extension portion 381, and the second extension portion 385 may extend in the lateral direction Y from said one end to the other end 386. The rear end of the first extension portion 381 and said one end of the second extension portion 385 may correspond to the same region.

The front end 382 of the first extension portion 381 may be located at a front end of each of the top extension portion 320 and the bottom extension portion 340 of the lower frame 300. That is, the front end 382 of the first extension portion 381 located at the front end of each of the top extension portion 320 and the bottom extension portion 340 may be opened frontward.

In the process in which the control panel 200 is inserted between the first front panel 112 and the second front panel 122 along the front and rear direction X, the sliding coupler 280 disposed on each of the top face 220 and the bottom face 230 may be inserted into the first extension portion 381 through the open front end 382 of the first extension portion 381 and may be moved in front and rear direction X along the first extension portion 381.

That is, the control panel 200 may be inserted between the first front panel 112 and the second front panel 122 while the sliding coupler 280 is positioned in front of the sliding coupling groove 380.

In one example, when the control panel 200 is completely inserted between the first front panel 112 and the second front panel 122 along the front and rear direction X, the sliding coupler 280 may be located at the rear end of the first extension portion 381 in the sliding coupling groove 380. The control panel 200 is slidable in the lateral direction Y in the state in which the sliding coupler 280 is moved rearward until the sliding coupler 280 is located at the rear end of the first extension portion 381.

When the control panel 200 slides in the lateral direction Y in the state in which the sliding coupler 280 is located at the rear end of the sliding coupling groove 380, the sliding coupler 280 may slide along the second extension portion 385 extending in the lateral direction Y from the rear end of the first extension portion 381.

When the second extension portion 385 extends from the first extension portion 381 toward one side in the lateral direction Y, the control panel 200 may slide toward said one side in the lateral direction Y and be coupled to the lower frame 300 in the state of being inserted between the first front panel 112 and the second front panel 122.

In the state in which the sliding coupler 280 is slid from said one end of the second extension portion 385 and positioned at the other end 386, a pair of side faces 240 of the control panel 200 may be respectively coplanar in the vertical direction Z with both ends in the lateral direction Y of the first front panel 112.

That is, when the sliding coupler 280 is located at the other end 386 of the second extension portion 385, the control panel 200 may be positioned entirely between the first front panel 112 and the second front panel 122 without protruding or being recessed in the lateral direction Y than the first front panel 112 and the second front panel 122.

The sliding coupling groove 380 may be in a form of being recessed downward from the top face of the top extension portion 320 or in a form of being recessed upward from the bottom face of the bottom extension portion 340, or may be opened in the vertical direction Z as shown in FIG. 5.

When the sliding coupling groove 380 is opened in the vertical direction Z in each of the top extension portion 320 and bottom extension portion 340, the sliding coupler 280 may be inserted into the sliding coupling groove 380 to penetrate the sliding coupling groove 380.

Figure 8:
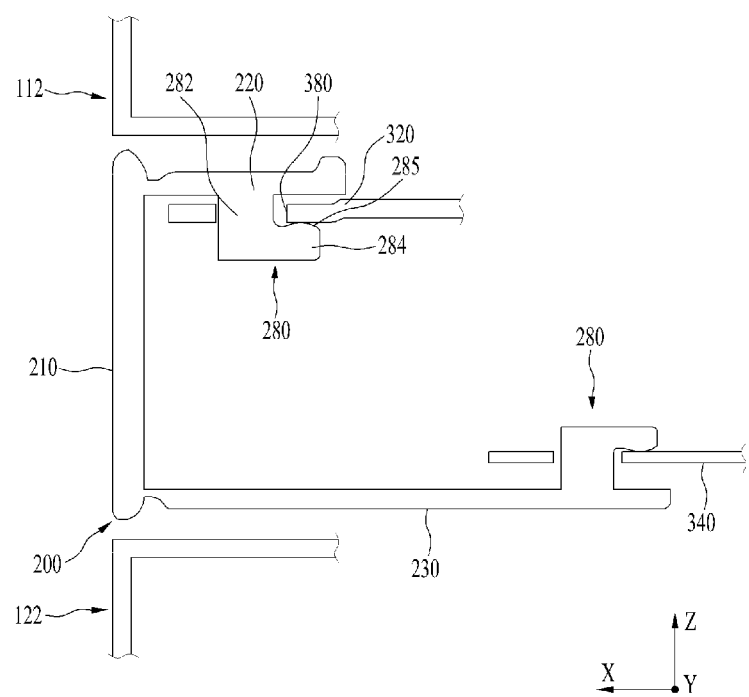
FIG. 8 is a view showing a cross-section of a control panel coupled to a lower frame viewed from a lateral direction in a laundry treating apparatus according to one implementation of the present disclosure.

In one example, FIG. 8 shows the sliding couplers 280 respectively inserted into the sliding coupling grooves 380 to respectively penetrate the sliding coupling grooves 380 according to one implementation of the present disclosure.

Referring to FIG. 8, the sliding coupler 280 according to one implementation of the present disclosure may include a sliding protrusion 282 and a sliding support 284.

The sliding protrusion 282 may protrude toward the top extension portion 320 or the bottom extension portion 340 facing thereto and slide in the sliding coupling groove 380, and the sliding support 284 may extend rearward from the sliding protrusion 282 to support the inner face of the top extension portion 320 or the inner face of the bottom extension portion 340 facing thereto.

Specifically, the sliding protrusions 282 may respectively protrude downward from the inner face, that is, a bottom face of the top face 220 and upward from the inner face, that is, a top face of the bottom face 230. The sliding protrusion 282 may have a shape of a pillar having a circular or polygonal cross-section.

The sliding coupler 280 may slide along the sliding coupling groove 380 while the sliding protrusion 282 penetrates the sliding coupling groove 380.

The sliding support 284 may extend from the sliding protrusion 282 in an insertion direction of the control panel 200, that is, in a rearward direction. The sliding support 284 may extend rearwards from a bottom of the sliding protrusion 282.

In the state in which the sliding protrusion 282 is positioned within the sliding coupling groove 380, at least a portion of the sliding support 284 may be in contact with the bottom face of the top extension portion 320 or the top face of the bottom extension portion 340.

That is, at least the portion of the sliding support 284 may be supported on the bottom face of the top extension portion 320 or the top face of the bottom extension portion 340. In a situation in which the control panel 200 is coupled to the lower frame 300, manufacturing tolerances may exist between the top face 220 and the top extension portion 320 and between the bottom face 230 and the bottom extension portion 340. Because of the tolerances, the control panel 200 coupled to the lower frame 300 may not be completely fixed in the vertical direction Z.

Accordingly, as the sliding support 284 extending rearward from the sliding protrusion 282 is constructed in the sliding coupler 280, the present disclosure allows the control panel 200 to be completely fixed also in the vertical direction Z by the top extension portion 320 and the bottom extension portion 340.

Therefore, the control panel 200 may be fixed in the front and rear direction X as the sliding protrusion 282 is located on the second extension portion 385 of the sliding coupling groove 380, and may be fixed in the vertical direction Z as the sliding support 284 supports the inner face of each of the top extension portion 320 and the bottom extension portion 340.

In one example, as shown in FIG. 8, in one implementation of the present disclosure, the sliding support 284 may have a sliding contact portion 285 disposed at a rear end thereof. The sliding contact portion 285 may be in contact with the inner face of the top extension portion 320 or the inner face of the bottom extension portion 340.

The sliding support 284 may support the inner face of the top extension portion 320, that is, the bottom face of the top extension portion 320, or the inner face of the bottom extension portion 340, that is, the top face of the bottom extension portion 340 through the sliding contact portion 285.

The sliding contact portion 285 may protuberate or protrude from the sliding support 284 toward the top extension portion 320 or the bottom extension portion 340. For example, the sliding contact portion 285 disposed on the top face 220 may protuberate upward from the sliding support 284, and the sliding contact portion 285 disposed on the bottom face 230 may protuberate downward from the sliding support 284.

When the sliding contact portion 285 is constructed in the sliding coupler 280, the sliding support 284 may serve as an elastic body in which portions except for the sliding contact portion 285 are bent.

Through the elastic deformation of the sliding support 284, the sliding contact portion 285 may press and support the top extension portion 320 or the bottom extension portion 340. Accordingly, coupling stability and a fixing force in the vertical direction Z of the control panel 200 may be effectively improved.

Figure 9:
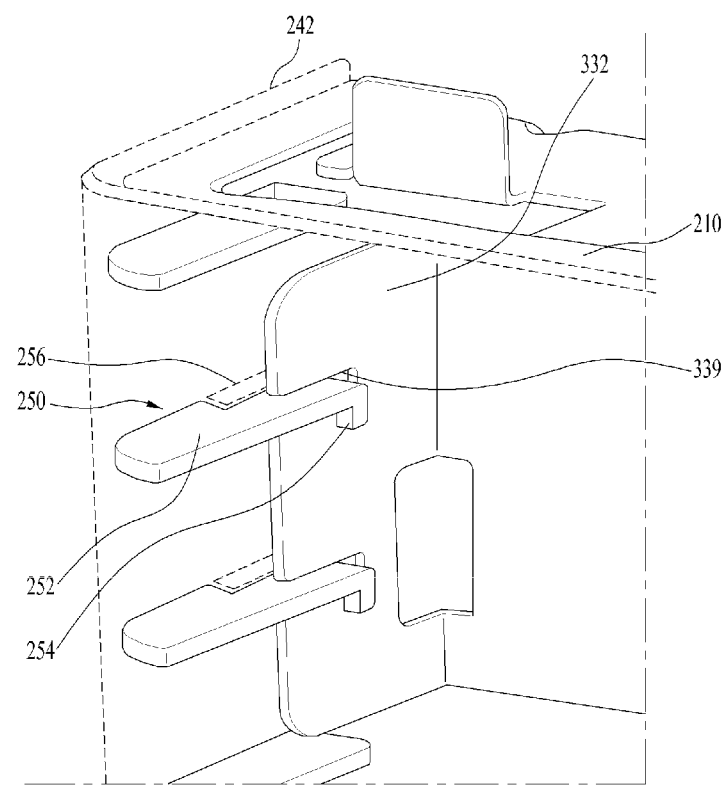
FIG. 9 is a diagram showing a sliding hook and a sliding hook groove in a laundry treating apparatus according to one implementation of the present disclosure.
Figure 10:
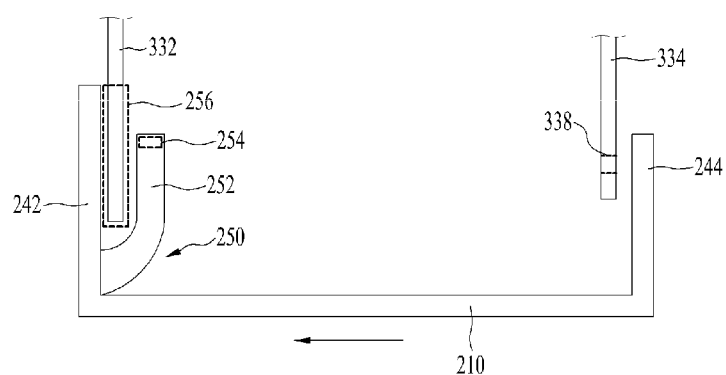
FIG. 10 is a schematic diagram showing a cross-section of a control panel viewed from the top before being slid in a laundry treating apparatus according to one implementation of the present disclosure.
Figure 11:
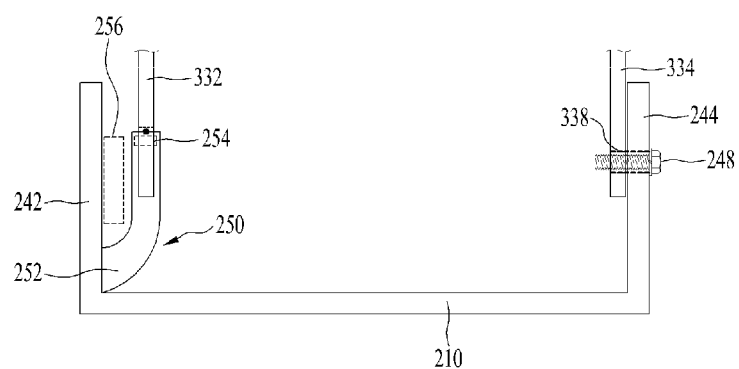
FIG. 11 is a schematic view showing a cross-section of a control panel in FIG. 10 that has been slid viewed from the top.

In one example, FIG. 5 shows side end extension portions 330 constructed on the lower frame 300 and the side faces 240 constructed on the control panel 200 according to one implementation of the present disclosure. Further, FIGS. 9 to 11 show a coupling structure between one side end extension portion 330 and one side face 240 arranged on one side in the lateral direction Y and a coupling structure between the other side end extension portion 330 and the other side face 240 on the other side in the lateral direction Y.

The side end extension portions 330 may extend frontward from both ends in the lateral direction Y of the main frame face 310, respectively, and the side faces 240 may extend rearward from both ends in the lateral direction Y of the front face 210 and may be coupled to the side end extension portions 330 facing thereto, respectively.

The side face 240 and the side end extension portion 330 may be formed in a shape of a plate intersecting the lateral direction Y, and may be arranged to be coplanar with each other.

The side end extension portions 330 may respectively extend frontwards from both ends in the lateral direction Y of the main frame face 310 of the lower frame 300 and may be positioned inward of the control panel 200. That is, the side end extension portion 330 may be disposed to face an inner face of the side face 240.

In the lower frame 300, the top extension portion 320, the bottom extension portion 340, and the side end extension portions 330 may be positioned inside the control panel 200 through an open bottom face of the control panel 200.

The side faces 240 may respectively extend rearward from both ends in the lateral direction Y of the front face 210 of the control panel 200, and may be connected to the top face 220 and the bottom face 230. The pair of side faces 240 may be respectively coupled with the side end extension portions 330 disposed inward of the pair of side faces 240 and facing the pair of side faces 240, respectively.

The control panel 200 may be inserted between the first front panel 112 and the second front panel 122 and slide in the lateral direction Y to be coupled with the top extension portion 320 and the bottom extension portion 340. In the state in which the control panel 200 is slid, each side face 240 is coupled with each side end extension portion 330, so that the control panel 200 may be stably coupled to the lower frame 300.

In one example, FIG. 9 shows a state in which the first side face 242 and the first side end extension portion 332 according to one implementation of the present disclosure are coupled to each other.

In one implementation of the present disclosure, the side faces 240 of the control panel 200 may include the first side face 242 and the second side face 244, and the side end extension portion 330 of the lower frame 300 may include the first side end extension portion 332 and the second side end extension portion 334.

The first side face 242 may be disposed at one end in the lateral direction Y of the control panel 200, and the first side end extension portion 332 may be disposed at one end in the lateral direction Y of the lower frame 300. That is, the first side face 242 and the first side end extension portion 332 may be arranged to be coplanar with or adjacent to each other. The first side end extension portion 332 facing an inner face of the first side face 242 may be coupled to the first side face 242.

The second side face 244 may be disposed at the other end in the lateral direction Y of the control panel 200, and the second side end extension portion 334 may be disposed at the other end in the lateral direction Y of the lower frame 300. That is, the second side face 244 and the second side end extension portion 334 may be arranged to be coplanar with or adjacent to each other. The second side end extension portion 334 facing an inner face of the second side face 244 may be coupled to the second side face 244.

Therefore, in the state in which the control panel 200 is inserted between the first front panel 112 and the second front panel 122 in the front and rear direction X and slid in the lateral direction Y, the first side face 242 may be coupled to the first side end extension portion 332 disposed inward of the first side face 242, and the second side face 244 may be coupled to the second side end extension portion 334 disposed inward of the second side face 244.

In one example, the first side face 242 may include a sliding hook 250, and the first side end extension portion 332 may include a sliding hook groove 339.

The sliding hook 250 may have a width in the lateral direction Y, and extend in the front and rear direction X to be inserted into the first side end extension portion 332 and be slid in the lateral direction Y. The sliding hook groove 339 may have a shape corresponding to a shape of the sliding hook 250 viewed from the lateral direction Y, and the sliding hook 250 may be inserted and slid in the sliding hook groove 339.

FIG. 6 shows the sliding hook 250 disposed on the control panel 200, and FIG. 9 shows the sliding hook 250 inserted into the sliding hook groove 339.

FIG. 10 shows a positional relationship between the sliding hook 250 and the sliding hook groove 339 before the control panel 200 slides in the lateral direction Y, and FIG. 11 shows a positional relationship between the sliding hook 250 and the sliding hook groove 339 in the state in which the control panel 200 has completely slid in the lateral direction Y and completely coupled to the lower frame 300.

The sliding hook 250 may be disposed inside the control panel 200. The sliding hook 250 may be formed in a shape extending rearward from the front face 210 or extending from the first side face 242 disposed at one end in the lateral direction Y of the front face 210 toward the other end in the lateral direction Y of the front face 210.

The sliding hook 250 may have a length in the front and rear direction X, and may have a width in the lateral direction Y. In the process in which the control panel 200 slides in the lateral direction Y to be coupled to the lower frame 300, the sliding hook 250 may be inserted into and slid in the sliding hook groove 339 of the first side end extension portion 332 in the lateral direction Y.

For example, in the state in which the control panel 200 is inserted between the first front panel 112 and the second front panel 122 along the front and rear direction X, the control panel 200 may be biased toward the other side in the lateral direction Y than the first front panel 112 and the second front panel 122.

That is, in the state in which the sliding coupler 280 is positioned in the first extension portion 381 of the sliding coupling groove 380, the control panel 200 may protrude toward the other side in the lateral direction Y than the first front panel 112 and the second front panel 122.

The control panel 200 may be slid toward said one end in the lateral direction Y, that is, toward the first side face 242 in the state of being inserted between the first front panel 112 and the second front panel 122. In this process, the sliding hook 250 may be inserted into the sliding hook groove 339 in the lateral direction Y.

The sliding hook groove 339 may be opened in the lateral direction Y, and a front end of the sliding hook groove 339 facing the front face 210 of the control panel 200 may be opened. The sliding hook 250 may be inserted into the sliding hook groove 339 while penetrating the sliding hook groove 339 in the lateral direction Y.

When viewed from the lateral direction Y, the sliding hook groove 339 may have the shape the same as or corresponding to the shape of the sliding hook 250, and may be coplanar with the sliding hook 250 in the lateral direction Y.

Eventually, the control panel 200 may be fixed in the front and rear direction X and the vertical direction Z as the top face 220 and the bottom face 230 are respectively coupled to the top extension portion 320 and the bottom extension portion 340 while the control panel 200 is inserted between the first front panel 112 and the second front panel 122 and slides in the lateral direction Y. in addition, the control panel 200 may be fixed in the front and rear direction X and the like as the first side face 242 is coupled to the first side end extension portion 332.

In one example, referring to FIG. 9, in one implementation of the present disclosure, the sliding hook 250 may include a sliding extension 252 and a sliding engagement portion 254. The sliding extension 252 may be extended in the front and rear directions X, and the sliding engagement portion 254 may protrude from the sliding extension 252 in the vertical direction Z.

The sliding extension 252 may have a length in the front and rear direction X. FIG. 9 shows the sliding extension 252 protruding from an inner face of the first side face 242 and extending in the front and rear direction X according to one implementation of the present disclosure.

In the sliding hook 250, as the sliding extension 252 extends in the front and rear direction X, the sliding engagement portion 254 may be inserted into the first side end extension portion 332 despite a difference in the position between the first side end extension portion and the sliding hook 250.

The sliding hook 250 may have a length extending in the front and rear directions X and a width extending in the lateral direction Y. Therefore, during the sliding process of the control panel 200, the sliding hook 250 may be continuously positioned within the sliding hook groove 339 without leaving the sliding hook groove 339.

In one example, the sliding engagement portion 254 may protrude from the sliding extension 252 in the vertical direction Z. FIG. 9 shows the sliding engagement portion 254 protruding downward from a rear end of the sliding extension 252 according to one implementation of the present disclosure.

As the sliding engagement portion 254 has the width in the lateral direction Y like the sliding extension 252, the sliding engagement portion 254 may be continuously positioned in the sliding hook groove 339 during the sliding process of the control panel 200.

Because the sliding hook groove 339 has a shape corresponding to the shape of the sliding hook 250 when viewed from the lateral direction Y, the sliding hook groove 339 may include portions respectively corresponding to the sliding extension 252 and the sliding engagement portion 254.

A length of the sliding extension 252 may be determined such that the sliding engagement portion 254 may be inserted into the first side end extension portion 332 in consideration of a length of the first side end extension portion 332 and a position of the sliding hook 250.

For example, as the length of the first side end extension portion 332 is smaller, the sliding hook 250 may allow the sliding extension 252 to have a large length. When the length of the first side end extension portion 332 is large, the sliding extension 252 may have a relatively small length.

In one example, because the sliding hook groove 339 has a shape corresponding to the shape of the sliding hook 250, as shown in FIG. 9, the sliding engagement portion 254 of the sliding hook 250 may be limited from moving in the front and rear directions X in the sliding hook groove 339.

Accordingly, when the control panel 200 slides in the lateral direction Y between the first front panel 112 and the second front panel 122, in the laundry treating apparatus 1 according to one implementation of the present disclosure, the sliding hook 250 having the sliding engagement portion 254 is inserted into the sliding hook groove 339 of the first side end extension portion 332, so that the movement of the control panel 200 in the front and rear direction X is limited.

In one example, in one implementation of the present disclosure, at least a portion of the sliding hook 250 may be spaced apart from the inner face of the first side face 242 to define an extension-inserted space 256 into which the first side end extension portion 332 is inserted. In the state in which the first side end extension portion 332 is inserted into the extension-inserted space 256, the sliding hook 250 may be inserted into and be slid in the lateral direction Y in the sliding hook groove 339.

Referring to FIG. 9, the sliding hook 250 may be spaced apart from the first side face 242 to define the extension-inserted space 256. The extension-inserted space 256 may correspond to a space in which the first side end extension portion 332 is located in the state in which the control panel 200 is inserted between the first front panel 112 and the second front panel 122.

That is, the extension-inserted space 256 may correspond to a space for accommodating the first side end extension portion 332 therein before the control panel 200 slides in the lateral direction Y. FIG. 10 shows the first side end extension portion 332 accommodated in the extension-inserted space 256 before the control panel 200 slides in the lateral direction Y.

A front end of the extension-inserted space 256 may be located in front of a front end of the first side end extension portion 332, so that the extension-inserted space 256 may accommodate the first side end extension portion 332 therein. A width in the lateral direction Y of the extension-inserted space 256 may be greater than that of the first side end extension portion 332.

When the sliding hook 250 is disposed on the inner face of the first side face 242, a portion of the sliding hook 250, for example, the front end of the sliding hook 250 as shown in FIGS. 9 and 10 may be connected to the first side face 242, and a portion located at the rear of the front end of the sliding hook 250 may be spaced apart from the first side face 242 to define the extension-inserted space 256.

When the sliding hook 250 is disposed on a rear face of the front face 210 of the control panel 200, an entirety of the sliding hook 250 may be spaced apart from the first side face 242.

Referring to FIGS. 10 and 11, the process in which the sliding hook 250 and the sliding hook groove 339 are coupled to each other will be described as follows.

First, in the state in which the control panel 200 is inserted between the first front panel 112 and the second front panel 122 as shown in FIGS. 2 to 3, that is, in the state the control panel 200 has not been slid in the lateral direction Y yet, the first side end extension portion 332 may be located in the extension-inserted space 256 defined inside the control panel 200, as shown in FIG. 10.

Thereafter, when the control panel 200 slides in the lateral direction Y, for example, in a direction from the other side in the lateral direction Y toward the first side face 242 disposed on one side in the lateral direction Y, as shown in FIG. 11, the sliding hook 250 positioned adjacent to the first side end extension portion 332 may slide toward the first side end extension portion 332 and be inserted into the sliding hook groove 339.

In one implementation of the present disclosure, in the state in which the sliding coupler 280 of the control panel 200 is positioned at the first extension portion 381 of the sliding coupling groove 380, the first side end extension portion 332 of the lower frame 300 may be located in the extension-inserted space 256 of the control panel 200.

Further, in the state in which the control panel 200 slides, and then, the sliding coupler 280 is positioned within the second extension portion 385, the sliding hook 250 may be located within the sliding hook groove 339.

That is, in one implementation of the present disclosure, a positional relationship between the sliding coupler 280 and the sliding coupling groove 380 is defined to correspond to a positional relationship between the sliding hook 250 and the sliding hook groove 339, so that the sliding coupler 280 and the sliding hook 250 may be efficiently and stably coupled to the sliding coupling groove 380 and the sliding hook groove 339, respectively, during the movement process in the front and rear direction X and the sliding process in the lateral direction of the control panel 200.

In one example, in the laundry treating apparatus 1 according to one implementation of the present disclosure, the side faces 240 of the control panel 200 may further include the second side face 244. The second side face 244 may be disposed at the other end in the lateral direction Y of the front face 210.

Further, the side end extension portions 330 may include the second side end extension portion 334. The second side end extension portion 334 may be disposed at the other end in the lateral direction Y of the main frame face 310 to face an inner face of the second side face 244.

Further, the laundry treating apparatus 1 according to one implementation of the present disclosure may further include a penetrating member 248. The penetrating member 248 may penetrate the second side face 244 to be coupled to a penetrated coupler defined in the second side end extension portion 334, thereby coupling the second side face 244 and the second side end extension portion 334 with each other.

Specifically, the second side face 244 may be formed in a shape of a plate parallel to the first side face 242, and may have a shape extending rearward from the other end in the lateral direction Y of the control panel 200. The second side end extension portion 334 may be disposed at the other end in the lateral direction Y of the main frame face 310 of the lower frame 300 and extend frontward.

The second side end extension portion 334 may be formed in a shape having one face parallel to the first side end extension portion 332, and may face the inner face of the second side face 244 in the state in which the control panel 200 is positioned between the first front panel 112 and the second front panel 122.

In one example, Referring to FIGS. 10 and 11, a distance between the first side end extension portion 332 and the second side end extension portion 334 may be shorter than a distance between the first side face 242 and the second side face 244. Accordingly, while the first side end extension portion 332 is in contact with the first side face 242, the second side end extension portion 334 may be spaced apart from the second side face 244. When the first side end extension portion 332 is spaced apart from the first side face 242, the second side end extension portion 334 may be in contact with the second side face 244.

The first side end extension portion 332 spaced apart from the first side face 242 is in a state in which the sliding hook 250 is inserted therein. In the control panel 200, in the state in which an inner face of the second side face 244 is in contact with the second side end extension portion 334, the coupling between the second side face 244 and the second side end extension portion 334 may be achieved by the penetrating member 248.

Referring to FIG. 11, the penetrating member 248 may penetrate the second side face 244 along the lateral direction Y while the second side face 244 is in a face-contact with the second side end extension portion 334. The penetrating member 248 penetrated the second side face 244 may be coupled to the penetrated coupler defined in the second side end extension portion 334.

The penetrating member 248 may be coupled to the penetrated coupler by penetrating or being inserted into the penetrated coupler. The penetrating member 248 may be formed in in a rivet type or a press-fitting type and coupled to the penetrated coupler, or may be formed in a shape of a bolt with a screw as shown in FIG. 11 and coupled to the penetrating member 248.

In one implementation of the present disclosure, in the state in which the control panel 200 has moved in the front and rear direction X, and then, has been slid along the lateral direction Y, as the second side face 244 is fixed to the second side end extension portion 334 by the penetrating member 248, the coupling process of the control panel 200 may be completed between the first front panel 112 and the second front panel 122.

As the control panel 200 slides between the first front panel 112 and the second front panel 122, the top face 220 and the bottom face 230 may be fixed in the front and rear direction X and the vertical direction Z by the sliding couplers 280 and the sliding coupling grooves 380, and the first side face 242 may be fixed in the front and rear direction X by the sliding hook 250 and the sliding hook groove 339.

In this state, the second side face 244 is fixed to the second side end extension portion 334 through the penetrating member 248 and the movement thereof is limited, so that the control panel 200 may be coupled and fixed to the lower frame 300 such that the movement of the control panel 200 is limited.

In one example, in one implementation of the present disclosure, the control panel 200 may be constructed such that the second side face 244 is in contact with the second side end extension portion 334 while the sliding coupler 280 is positioned at the other end 386 of the second extension portion 385. The coupling relationship as described above may be achieved by adjusting the length of the second extension portion 385 or adjusting the position of the second side end extension portion 334 in a design manner.

Eventually, as the control panel 200 is inserted between the first front panel 112 and the second front panel 122 and slides in the lateral direction Y, the control panel 200 is in a state of being fixed in the front and rear directions X with respect to the lower frame 300 and slidable in the lateral direction Y. In the above state, the second side face 244 is at least limited in movement in the lateral direction Y with respect to the second side end extension portion 334, so that the fixed state in which the omnidirectional movement of the control panel 200 is limited may be realized.

The lower frame 300 according to one implementation of the present disclosure will be described in detail again referring to FIG. 5.

In one implementation of the present disclosure, the lower frame 300 may further include a top coupler 350. The top coupler 350 may protrude upward from the top extension portion 320 and be coupled to the bottom of the first front panel 112.

The top coupler 350 may be disposed on the top extension portion 320. The top coupler 350 may protrude upward from the top extension portion 320 positioned below the first front panel 112 and may be coupled to the bottom of the first front panel 112.

There may be various numbers, positions, and shapes of the top coupler 350 or schemes of coupling with the first front panel 112 as needed. For example, in one implementation of the present disclosure, the first front panel 112 may include a bottom bent portion, and the top coupler 350 may include a panel inserted portion inserted into the bottom bent portion.

The first front panel 112 may include the bottom bent portion extending rearward from a bottom thereof. The bottom bent portion may be bent at a bottom of a front face of the first front panel 112.

The bottom bent portion may be disposed in parallel with the top extension portion 320, and the top coupler 350 may include a panel inserted portion protruding toward the bottom bent portion to penetrate the bottom bent portion.

The panel inserted portion may penetrate the bottom bent portion of the first front panel 112 and may be inserted into the bottom of the first front panel 112. The top coupler 350 may be coupled to the first front panel 112 as the panel inserted portion penetrates and is inserted into the bottom bent portion.

In one implementation of the present disclosure, the lower frame 300 is fixed by being coupled with each first side panel 115, is coupled to the control panel 200 at the front and fixes the control panel 200, is coupled to the first front panel 112 through the top extension portion 320, and supports the first front panel 112, thereby effectively improving structural stability of the laundry treating apparatus 1 according to one implementation of the present disclosure.

In one implementation of the present disclosure, at least a portion of the panel inserted portion may extend in an inclined manner such that a top thereof is positioned frontward from a bottom thereof. That is, the panel inserted portion may be formed to be inclined frontwards upwardly. An inclined portion of the panel inserted portion may be formed on an entirety of or only a portion of the panel inserted portion.

As the panel inserted portion extends in the inclined manner, the top thereof is disposed close to the front face of the first treating apparatus 10. Accordingly, the bottom bent portion of the first front panel 112 is moved rearward, so that the panel inserted portion may be easily inserted, and fixation of the first front panel 112 into which the panel inserted portion may be strengthened.

In one example, in one implementation of the present disclosure, the top extension portion 320 may be spaced downwardly apart from the first front panel 112, and the top coupler 350 may further include an ascending extension. The ascending extension may extend from the top extension portion 320 toward the bottom bent portion. In addition, the panel inserted portion may be disposed at a top of the ascending extension to penetrate the bottom bent portion.

The first front panel 112, for example, the bottom bent portion of the first front panel 112 and the top extension portion 320 may be spaced apart from each other. The top face 220 of the control panel 200 may be inserted between the top extension portion 320 and the first front panel 112.

The top coupler 350 may include the ascending extension extending upward from the top extension portion 320, and the panel inserted portion extending from the ascending extension may be inserted into the first front panel 112.

The top fastening portion may include a first top fastening portion and a second top fastening portion. The ascending extension may be included in the first top fastening portion. That is, in the first top fastening portion, the ascending extension extending from the top extension portion 320 may extend to the bottom bent portion of the first front panel 112, and the panel inserted portion may be disposed on the top of the ascending extension and be inserted into the first front panel 112 through the bottom bent portion.

There may be various shapes or extension directions of the ascending extension. For example, the panel inserted portion may be in a shape of a plate extending in an inclined manner frontward from the top of the plate-shaped ascending extension.

In one example, in one implementation of the present disclosure, the top coupler 350 may include a top support, and the panel inserted portion may be disposed on the top support. For example, in one implementation of the present disclosure, the top coupler 350 may include a second top coupler 352, the second top coupler 352 may include the top support, and the panel inserted portion may be disposed on the top support.

Specifically, the top support may be disposed on the top extension portion 320 and support the bottom bent portion. That is, the top support may be constructed such that a top thereof is in contact with the bottom bent portion and supports the bottom bent portion upward.

The top support may have a face for supporting the bottom bent portion or may be formed in a protrusion shape to be in contact with the bottom bent portion.

When the top support is disposed on the top coupler 350, for example, in a case of the second top coupler 352 including the top support, the panel inserted portion may be disposed on the top support to penetrate the bottom bent portion.

That is, the second top coupler 352 may be disposed such that the top support is in contact with the bottom bent portion on the top extension portion 320, and the panel inserted portion may be constructed to protrude upward from the top support in contact with the bottom bent portion to penetrate the bottom bent portion.

As above, in one implementation of the present disclosure, the top coupler 350 is constructed to include the top support supporting the bottom bent portion, so that the bottom of the first front panel 112 may be supported upward by the lower frame 300 and may be structurally stabilized.

In one example, the top support may include a top support face that is spaced upwardly from the top extension portion 320, and is disposed to be in parallel with the bottom bent portion and supports the bottom bent portion, and the panel inserted portion may extend from the top support face.

The top support face may be disposed to be in parallel with the bottom bent portion, and may also be disposed to be in parallel with the top extension portion 320. That is, the top support face may be in a form offset upward from the top extension portion 320.

The top support face may be preferably in a face-contact with a bottom face of the bottom bent portion to support the first front panel 112.

In addition, in one implementation of the present disclosure, the top support may further include a top connection portion connecting the top support face and the top extension portion 320 with each other, and the panel inserted portion may be disposed on a front end of the top support face and at least partially extend in an inclined manner such that a top thereof is positioned frontward of a bottom thereof.

The top support face may be formed in a plate shape and may be disposed in parallel with the bottom bent portion, and may have a connection relationship with the top extension portion 320 by the top connection portion. That is, in the top support, the top support face may be connected to the top extension portion 320 by the top connection portion.

The top connection portion may be formed in various shapes. For example, the top connection portion may be formed in a substantially plate shape and extend from one edge of the top support face toward the top extension portion 320.

In one example, in a case of the second top coupler 352 having the top support, the panel inserted portion may extend upward from the front end, that is, a front edge of the top support face. Accordingly, the first front panel 112 may be supported on the top support face while being moved rearward on the top of the lower frame 300, and the panel inserted portion may penetrate and be coupled to the lower end bending portion.

In addition, the top connection portion may be formed at both side edges and a rear edge of the top support face to stably fix the top support face to the top extension portion 320.

In one implementation of the present disclosure, the top coupler 350 includes a first top coupler 351 having the ascending extension and coupled to the first front panel 112, and a second top coupler 352 that supports and fixes the first front panel 112, so that a coupling strength and a support strength between the first front panel 112 and the lower frame 300 may be efficiently determined. The numbers and positions of the first top coupler 351 and the second top coupler 352 may be variously determined as needed.

In one implementation of the present disclosure, the main frame face 310 of the lower frame 300 may include the convex portion that is curved such that a front face of the convex portion is convex and a rear face of the convex portion is concave to define a space at the rear.

The convex portion may have a shape extending along the lateral direction Y of the lower frame 300 so as to be parallel with a longitudinal direction of the main frame face 310. In addition, as the front face of the convex portion is convex and the rear face thereof is concave, the space is secured at the rear, so that the convex portion and the components inside the first treating apparatus 10 do not interfere with each other.

The convex portion may be formed to include the top of the main frame face 310, and the top extension portion 320 may extend from the convex portion. That is, the convex portion may have a shape in which the space defined at the rear is opened upward.

The convex portion may extend downward from the top of the main frame face 310 and may extend along the lateral direction Y. The connection hole may be defined in the convex portion or may be positioned avoiding the convex portion.

Because the lower frame 300 has the shape in which the convex portion is formed on the top of the main frame face and the space defined at the rear is opened upward, a space in which the base cabinet and the like that may be positioned at the rear of the lower frame 300 may be effectively secured, and a support strength of the first front panel 112 supported by the top extension portion 320 may be effectively improved.

In one implementation of the present disclosure, the top face 220 of the control panel 200 may have a coupler receiving groove into which the top coupler 350 of the lower frame 300 is inserted and received.

Specifically, in one implementation of the present disclosure, the top face 220 of the control panel 200 may be inserted between the bottom bent portion and the top extension portion 320, and as described above, the top extension portion 320 may include the top coupler 350 protruding upward and inserted into the bottom bent portion.

In addition, the top face 220 may include the coupler receiving groove that is opened rearward, and the top coupler 350 is inserted into the coupler receiving groove from the rear.

The coupler receiving groove may have a shape extending in the front and rear direction X in consideration of an insertion direction of the control panel 200, and a width of the coupler receiving groove may be greater than that of the top coupler 350. A rear end of the coupler receiving groove may be disposed to face toward the top coupler 350 and opened rearward, so that the top coupler 350 may be inserted into the coupler receiving groove through the open rear end of the coupler receiving groove.

That is, in the process in which the control panel 200 in front of the lower frame 300 is moved rearward and inserted, the top coupler 350 of the lower frame 300 may move frontward from the rear of the coupler receiving groove and be inserted into the coupler receiving groove.

Accordingly, the top extension portion 320 having the top coupler 350 coupled to the first front panel 112 and supporting the first front panel 112 is included in the lower frame 300. In the structure in which the top face 220 of the control panel 200 is inserted between the top extension portion 320 and the bottom bent portion of the first front panel 112, the top coupler 350 protruding from the top extension portion 320 of the lower frame 300 toward the bottom bent portion may be positioned without structural interference by the coupler receiving groove. In addition, the top face 220 of the control panel 200 may also be inserted between the first front panel 112 and the top extension portion 320 of the lower frame 300 without interference by the top coupler 350.

In one example, FIG. 6 shows an electric parts coupler 228 protruding downward from the inner face of the top face 220 of the control panel 200. In one implementation of the present disclosure, the control panel 200 may further include the electric parts and the electric parts coupler 228, and the top extension portion 320 of the lower frame 300 may include a front receiving groove 324 into which the electric parts coupler 228 is inserted and received.

The electric parts coupler 228 may protrude downward from the inner face of the top face 220 and may be coupled to the electric parts inside the control panel 200. The electric parts coupler 228 may include a plurality of electric parts couplers. The electric parts coupler 228 may have a protrusion shape and be inserted into and coupled to a groove defined in the electric parts, or may be disposed to rearwardly support a rear face of the electric parts.

In one example, the top extension portion 320 of the lower frame 300 may be located below the top face 220 of the control panel 200, and thus, in the insertion process of the control panel 200, the electric parts coupler 228 may be in contact with a front end of the top extension portion 320 and interfere with the movement of the control panel 200.

Accordingly, in one implementation of the present disclosure, the front receiving groove 324 into which the electric parts coupler 228 is inserted and received may be defined at the front end of the top extension portion 320.

The front receiving groove 324 may be defined to face toward the electric parts coupler 228. That is, the front receiving groove 324 may be located at the rear of the electric parts coupler 228. The front receiving groove 324 may extend in the front and rear direction X in consideration of the coupling direction of the control panel 200, and a front end of the front receiving groove 324 may be opened frontward.

In the process in which the control panel 200 is inserted between the first front panel 112 and the second front panel 122, the electric parts coupler 228 may be inserted into the front receiving groove 324 through the open front end of the front receiving groove 324.

Although the present disclosure has been illustrated and described in relation to a specific embodiment, it is understood that the present disclosure may be variously improved and changed within the scope of the technical idea of the present disclosure provided by the following claims. It will be obvious to those of ordinary skill in the industry.

What is claimed is:

1. A laundry treating system comprising:
a first treating apparatus having a first front panel and a first drum disposed inside the first treating apparatus and configured to accommodate a first laundry;
a second treating apparatus disposed beneath the first treating apparatus and supporting the first treating apparatus, the second treating apparatus having a second front panel and a second drum disposed inside the second treating apparatus and configured to accommodate a second laundry; and
a control panel disposed between the first front panel and the second front panel, the control panel being configured to communicate with the first treating apparatus and the second treating apparatus,
wherein the control panel is positioned between the first front panel and the second front panel and extends along a first direction between opposite lateral sides of the laundry treating system, the control panel being configured to be slid in the first direction to thereby be fixed between the first front panel and the second front panel, the first direction.

2. The laundry treating system of claim 1, wherein the first treating apparatus includes a lower frame disposed behind the control panel and coupled to the control panel.

3. The laundry treating system of claim 2, wherein the lower frame of the first treating apparatus includes:
a main frame face extending along the first direction, the main frame face being positioned behind the control panel and defining an interior of the first treating apparatus from the control panel;
a top extension portion extending frontward from a top of the main frame face; and
a bottom extension portion extending frontward from a bottom of the main frame face, and
wherein the control panel is configured to be slid in the first direction to thereby be coupled to the top extension portion and the bottom extension portion.

4. The laundry treating system of claim 3, wherein the control panel includes:
- a front face being exposed from the first treating apparatus;
- a top face extending rearward from a top of the front face; and
- a bottom face extending rearward from a bottom of the front face, and
- wherein the top face and the bottom face are configured to, based on the control panel being slid in the first direction, be respectively coupled to the top extension portion and the bottom extension portion.

5. The laundry treating system of claim 4, wherein the top face of the control panel is disposed between the top extension portion of the lower frame and the first front panel, and
- wherein the bottom face of the control panel is disposed between the bottom extension portion of the lower frame and the second front panel.

6. The laundry treating system of claim 5, wherein the top face and the bottom face of the control panel include sliding couplers protruding toward the top extension portion and the bottom extension portion of the lower frame, respectively, and
- wherein the top extension portion and the bottom extension portion of the lower frame include sliding coupling grooves, the sliding couplers of the control panel being configured to, based on the control panel being slid in the first direction, be inserted into the sliding coupling grooves of the lower frame.

7. The laundry treating system of claim 6, wherein each of the sliding coupling grooves of the lower frame includes:
- a first extension portion extending rearward from a front end of each of the sliding coupling grooves and being forwardly opened, each of the sliding couplers of the control panel being configured to be inserted rearwardly into the first extension portion.

8. The laundry treating system of claim 7, wherein each of the sliding coupling grooves of the lower frame includes:
- a second extension portion having a first end connected to a rear end of the first extension portion, and an opposite second end extending in the first direction from the first end, each of the sliding couplers being configured to be slid in the first direction within the second extension portion.

9. The laundry treating system of claim 8, wherein each of the sliding couplers of the control panel includes:
- a sliding protrusion protruding toward each of the top extension portion and the bottom extension portion, the sliding protrusion being configured to be inserted into and slid in each of the sliding coupling grooves of the lower frame.

10. The laundry treating system of claim 9, wherein each of the sliding couplers of the control panel includes:
- a sliding support extending rearward from the sliding protrusion and supporting an inner face of each of the top extension portion and the bottom extension portion of the lower frame.

11. The laundry treating system of claim 10, wherein a rear end of the sliding support of the control panel includes a sliding contact portion configured to contact the inner face of each of the top extension portion and the bottom extension portion of the lower frame.

12. The laundry treating system of claim 8, wherein the lower frame further includes side end extension portions respectively extending frontward from opposite lateral ends of the main frame face,
- wherein the control panel further includes side faces extending rearward from opposite lateral ends of the front face of the control panel, and
- wherein the side faces of the control panel are respectively coupled to the side end extension portions of the lower frame.

13. The laundry treating system of claim 12, wherein the side faces of the control panel include a first side face disposed at a first lateral end of the front face of the control panel,
- wherein the side end extension portion of the lower frame includes a first side end extension portion disposed at a first lateral end of the main frame face and facing an inner face of the first side face,
- wherein the first side face of the control panel includes a sliding hook protruding from the inner face of the first side face toward the first side end extension portion and inserted into the first side end extension portion, and
- wherein the first side end extension portion of the lower frame includes a sliding hook groove penetrating the first side end extension portion in the first direction and facing the sliding hook, the sliding hook being configured to be slid in the first direction and inserted into the sliding hook groove.

14. The laundry treating system of claim 13, wherein the sliding hook of the control panel includes:
- a sliding extension extending along a second direction perpendicular to the first direction; and
- a sliding engagement portion protruding in a vertical direction from the sliding extension, and
- wherein the sliding hook groove of the lower frame has a shape corresponding to a shape of the sliding hook of the control panel, the sliding hook of the control panel being configured to be inserted into and slid in the sliding hook groove of the lower frame.

15. The laundry treating system of claim 13, wherein at least a portion of the sliding hook of the control panel is spaced apart from the inner face of the first side face of the control panel and defines an extension insertion space, wherein the first side end extension portion of the lower frame is configured to be inserted into the extension insertion space of the control panel, and
- wherein the sliding hook of the control panel is configured to be inserted into and slid in the first direction within the first side end extension portion of the lower frame based on the first side end extension portion of the lower frame being inserted into the extension insertion space of the control panel.

16. The laundry treating system of claim 15, wherein the first side end extension portion of the lower frame is positioned within the extension insertion space of the control panel based on the sliding coupler of the control panel being positioned within the first extension portion of the lower frame.

17. The laundry treating system of claim 16, wherein the sliding hook of the control panel is positioned within the sliding hook groove of the lower frame based on the sliding coupler of the control panel being positioned within the second extension portion of the lower frame.

18. The laundry treating system of claim 13, wherein the side faces of the control panel include a second side face disposed at a second lateral end of the front face of the control panel,
- wherein the side end extension portion of the lower frame includes a second side end extension portion disposed at a second lateral end of the main frame face and facing an inner face of the second side face, and wherein the laundry treating system further includes a penetrating member configured to couple the second side face of the control panel with the second side end extension portion of the lower frame by penetrating the second side face of the control panel and being coupled to a penetration coupler defined in the second side end extension portion of the lower frame.

19. The laundry treating system of claim 18, wherein the second side face of the control panel is configured to contact the second side end extension portion of the lower frame based on the sliding coupler being positioned at the second end of the second extension portion of the lower frame.

20. The laundry treating system of claim 1, wherein the first treating apparatus includes opposing first side panels, and wherein the second treating apparatus includes opposing second side panels that are flush with the first side panels.

\* \* \* \* \*